United States Patent

Yoshikawa et al.

[11] Patent Number: 5,247,402
[45] Date of Patent: Sep. 21, 1993

[54] APPARATUS FOR HIGH SPEED SEARCHING AND REPRODUCTION OF DATA RECORDED IN A TAPE MEDIUM

[75] Inventors: Akira Yoshikawa, Nara; Kazuo Arai, Hirakata, both of Japan

[73] Assignee: Matsushita Electric Industrial Co., Ltd., Kadoma, Japan

[21] Appl. No.: 611,798

[22] Filed: Nov. 13, 1990

[30] Foreign Application Priority Data

Nov. 14, 1989 [JP] Japan .................. 1-295860
Jun. 12, 1990 [JP] Japan .................. 2-153660

[51] Int. Cl.⁵ .............................. G11B 19/20
[52] U.S. Cl. ....................... 360/72.2; 360/51
[58] Field of Search ............ 360/8, 15, 51, 70, 72.2

[56] References Cited

U.S. PATENT DOCUMENTS

| | | | |
|---|---|---|---|
| 4,758,902 | 7/1988 | Okamoto et al. | 360/15 X |
| 4,774,605 | 9/1988 | Kato | 360/72.2 |
| 4,794,473 | 12/1988 | Kawasaki | 360/70 |
| 4,862,299 | 8/1989 | Hagita | 360/51 X |
| 4,872,070 | 10/1989 | Cooper et al. | 360/15 |
| 4,872,073 | 10/1989 | Fincher et al. | 360/51 |
| 4,943,872 | 7/1990 | Yamazaki | 360/8 |
| 5,083,225 | 1/1992 | Morisaki et al. | 360/15 X |

FOREIGN PATENT DOCUMENTS

| | | |
|---|---|---|
| 0197782 | 10/1986 | European Pat. Off. ........... 360/70 |
| 0324126 | 7/1989 | European Pat. Off. . |
| 0308120 | 8/1989 | European Pat. Off. ........ 360/72.1 |
| 3808198 | 9/1988 | Fed. Rep. of Germany . |
| 3841259 | 8/1989 | Fed. Rep. of Germany . |
| 61-190745 | 8/1986 | Japan . |

OTHER PUBLICATIONS

Patent Abstracts of Japan, vol. 11, No. 151 (P-576) May 1987, of JP-A-61 284850 published Dec. 1986.
T. Adachi, et al., "A Fast Random Accessing Scheme for R-Dat", IEEE Transactions vol. CE-33, No. 3, Aug. 1987, pp. 275-284.

Primary Examiner—Joseph L. Dixon
Assistant Examiner—David L. Robertson
Attorney, Agent, or Firm—Cushman, Darby & Cushman

[57] ABSTRACT

An apparatus for high speed searching and reproduction of data recorded in a tape medium includes magnetic tape, a tape mover, a high speed tape mover, a rotation cylinder with at least one head, a speed sensor, a controller, and signal converter and processor. The speed sensor generates pulses based on the speed of the rotation cylinder. The controller controls the rotation speed of a rotation cylinder based on the pulses. The controller controls the rotation speed so that a track-directional component of a relative speed between a head of a rotation cylinder and the magnetic tape in a high speed moving state realized by the high speed mover equals a first moving state realized by the tape mover. The signal converter converts at least sub-code data of output signals issued from the head into digital signals in both the first moving state and the high-speed moving state. The sub-code data represents tape-position information. A signal processor processes the digital signals issued from the signal converter to read out the sub-code data.

14 Claims, 10 Drawing Sheets

APPARATUS FOR HIGH SPEED SEARCHING AND REPRODUCTION OF DATA RECORDED IN A TAPE MEDIUM

FIELD OF THE INVENTION

The present invention relates to a tape reproducing apparatus such as a digital audio tape recorder (hereinafter is referred to as DAT) or a VTR (Video Tape Recorder) which reproduces signals recorded in tracks formed in tape recording means such as a magnetic tape obliquely with respect to its moving direction.

DESCRIPTION OF THE RELATED ART

In recent years, controllability for searching a position of the tape has been improved in, for instance, the DAT. In such DAT, a sub-code information such as addresses or recording numbers is recorded in advance in the tracks formed obliquely in the tape. By reading out this information, the DAT detects a position to be searched in the tape. Reading-out is also carried out during high-speed winding, and it is expected to detect the position to be searched in a further-high-speed winding state. For instance, such a conventional DAT is disclosed in the gazette of the Japanese unexamined patent application (TOKKAI) sho 61-190745.

Hereafter, outline of construction of the conventional tape reproducing apparatus, typically the DAT, is described. In a generally-known construction, a cassette tape is loaded in the tape reproducing apparatus, and a tape wound on a supply reel is forwarded to and wound by a take-up reel. On the way of taking-up from the supply reel to the take-up reel, a tape is pulled by posts so that one surface of the tape is wound on and around a rotation cylinder. In a playback state, the tape is forwarded by a capstan at a fixed standard tape speed $V_T$ (8.5 mm/sec), and also, the rotation cylinder on which heads are provided is rotated at a constant rated speed. Information recorded in the tape are reproduced by the heads, and output signals issued from the heads are input to a signal processing circuit. The above-mentioned information includes PCM (Pulse Code Modulation) information and sub-code information. The signal processing circuit reproduces music signals from the output signal based on the PCM information and derives data about a position of the tape and a channel number of music etc. from the output signal based on the sub-code information.

In a state of fast-forwarding, the tape is also pulled by the posts and wound on the rotation cylinder in the similar way to that in the playback state. In this state, however, the tape is advanced at a high speed (normally 200×$V_T$) from the supply reel to the take-up reel without using the capstan. While the tape is forwarded at the high speed, the head provided in the rotation cylinder reproduces the information in the tape, and the output signals of the head are input to the signal processing circuit. The signal processing circuit derives data about a position of the tape and a music number etc. from the output signal based on the sub-code information.

In a state of rewinding, the tape is rewound at the high speed in a reverse direction to that in the fast-forwarding, namely from the take-up reel to the supply reel. In the similar way to that in the fast-forward state, the signal processing circuit derives the data about a position of the tape and a music number etc. from the output signal based on the sub-code information.

Hereupon, in order to normally operate the signal processing circuit, it is necessary to make a frequency of input signals equal to that in the playback state even at the fast-forwarding/rewinding state. Therefore, a track-directional component of a relative speed between the heads and the tape has to be kept constant always. Rotation speed N of the cylinder is determined by the following equation:

$$N = N_0 \left( 1 + \frac{n-1}{V_{HO}} \cdot V_T \cos\theta' \right), \tag{1}$$

wherein:
  n: real number
  $N_O$: rotation speed of the cylinder in the playback,
  $V_T$: tape speed in the playback,
  $V_{HO}$: relative speed between the heads and the track, and
  $\theta'$: angle between the track and an edge of the tape.

Figure 10:
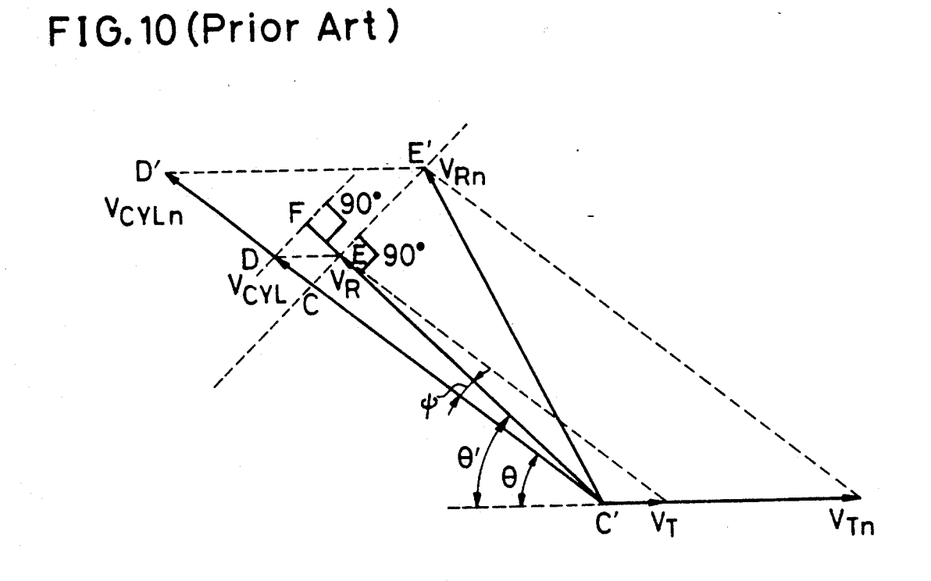
FIG. 10 is a vector diagram in the first-forward state showing a relative speed between the head speed and the tape speed in the conventional tape reproducing apparatus.

The above equation (1) can be converted into another equation for representing a circumferential speed of the cylinder under the condition that a diameter of the cylinder is 30 mm and $N_O$ is 2000 (r.p.m.).

$$\begin{aligned} V_{CYLFFn} &= V_{CYL}\left( 1 + \frac{n-1}{V_R} \cdot V_T \cos\theta' \right) \\ &= V_{CYL} + (n-1) \cdot V_{CYL} \frac{V_T \cos\theta'}{V_R}, \end{aligned} \tag{2}$$

wherein
  $V_{CYL}$: circumferential speed of the cylinder at the standard speed = 3141.59 (mm/sec),
  $V_R$: relative speed between the heads and the tape at the standard playback = $V_{HO}$ = 3133.49 (mm/sec), and
  $V_{CYLFFn}$: circumferential speed of the cylinder at a fast-forward driving speed of (n×$V_T$).
  FIG. 10 is a vector diagram showing geometrical meaning of the above equation (2). New letters shown on the figure are defined as follows:
  $V_{TFFn}$: tape speed of n×$V_T$ ($V_T$=8.15 (mm/sec)) in the fast-forward driving,
  $V_{RFFn}$: relative speed between the heads and the tape at the fast-forwarding speed of (n×$V_T$),
  $\theta$: lead angle of the cylinder = 6°22', and
  $\phi$: difference of angle between an angle of the track and the lead angle.

In FIG. 10, the circumferential speed $V_{CYLFFn}$ of the cylinder at the fast-forwarding of (n×$V_T$) is represented by a vector $\vec{CD'}$. The vector $\vec{CD'}$ holds a relation:

$$\vec{CD'} = \vec{CD} + \vec{DD'}$$

Herein, since a triangle CDE is similar in shape to a triangle CD'E', a vector DD' is represented by:

$$\vec{DD'} = (n-1) \cdot \vec{CD}.$$

As compared with the equation (2), the following relations are obtainable:

$$\vec{CD} = V_{CYL}, \text{ and} \tag{3}$$

-continued
$$\vec{DD'} = (n-1) \cdot V_{CYL} \frac{V_T \cos\theta'}{V_R}.$$

Further, a vector $\vec{CD}$ is represented by the following equation based on a similarity between a triangle C'CE and a triangle C'DF:

$$\vec{CD} = \vec{CD'} \cdot \frac{|EF|}{|CF|}$$

$$= V_{CYL} \frac{|V_T \cos\theta'|}{|V_R + V_T \cos\theta'|}.$$

Since an absolute value of $V_T \cos\theta'$ is very much smaller than that of $V_R$ so that it is enough to disregard the presence of $V_T \cos\theta'$, the following equation is obtainable:

$$\vec{CD} = V_{CYL} \frac{|V_T \cos\theta'|}{|V_R|}.$$

In view of above, it is understood that the rotation speed of the cylinder at the fast-forward driving is represented by the equation (2), and the equation (1) is thereby proved to hold.

In FIG. 10, the circumferential speed C'D' is represented by the following relation:

$$\vec{C'D'} = \vec{C'C} + \vec{CD'}.$$

Respective terms are as follows:

$$\vec{CC} = \frac{V_R}{\cos\phi}, \text{ and}$$

$$\vec{CD'} = n \times \left( V_{CYL} - \frac{V_R}{\cos\phi} \right).$$

Therefore, the circumferential speed of the cylinder at the fast-forwarding of $(n \times V_T)$ is obtainable by an equation:

$$V_{CYLFFn} = \frac{V_R}{\cos\phi} + n \times \left( V_{CYL} - \frac{V_R}{\cos\phi} \right). \quad (4)$$

Similarly, the circumferential speed of the cylinder at the rewinding is obtainable by an equation:

$$V_{CYLREWn} = \frac{V_R}{\cos\phi} - n \times \left( V_{CYL} - \frac{V_R}{\cos\phi} \right). \quad (5)$$

However, in the above-mentioned construction, the circumferential speed of the rotation cylinder becomes relatively slow in response to increase of the tape speed at the rewinding. When it is intended that the track-directional component of the relative speed between the heads and the tape is kept constant, the rotation speed of the rotation cylinder comes close to zero at a comparatively low tape-speed, thereby resulting in an undesirable state that information recorded in the tape is not read out.

OBJECT AND SUMMARY OF THE INVENTION

An object of the present invention is to offer a tape reproducing apparatus which is capable of preventing a failure of reading-out of the necessary informations recorded in a tape even in the high-speed moving state, especially in the rewinding state.

In order to achieve the above-mentioned object, the tape reproducing apparatus of the present invention comprises:

first moving means for moving a tape, in which oblique tracks are to be formed with respect to a moving direction of the tape, at least at a constant speed which is set faster than a standard speed;

high-speed moving means for moving the tape at a speed which is set faster than any tape speed realized by the first moving means;

a rotation cylinder having at least one head;

speed sensor means for generating pulse in proportion to a rotation speed of the rotation cylinder;

control means for controlling the rotation speed of the rotation cylinder in response to the pulses;

signal conversion means for converting output signals issued from the head into digital signals at the time when the output signals have a frequency based on a state that the tape is moved at a constant speed which is set faster than the standard speed and the rotation cylinder is rotated at a constant speed which is set faster than a standard speed of the rotation cylinder; and signal processing means for processing the digital signals of a frequency issued from the signal conversion means.

According to the above-mentioned tape reproducing apparatus, failure (undesirable skip) of reading-out of the informations recorded in the tape is prevented, and the speedup of moving the tape is realized. Further, since fluctuation of frequency of output signals issued from the heads is lowered, the information in the tape is surely read out by the heads.

When the tape is forwarded at a speed which is set faster than the standard speed, a high-speed playback is realized. Therefore, working hours for editing or making reproduction are reduced. In case where the tape reproducing apparatus of the present invention is employed as a data recording apparatus for the computer, it is possible to raise a transferring rate of the data. High-speed access is thereby realized.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Hereafter, preferred embodiments of the present invention are described with reference to the accompanying drawings.

Figure 1:
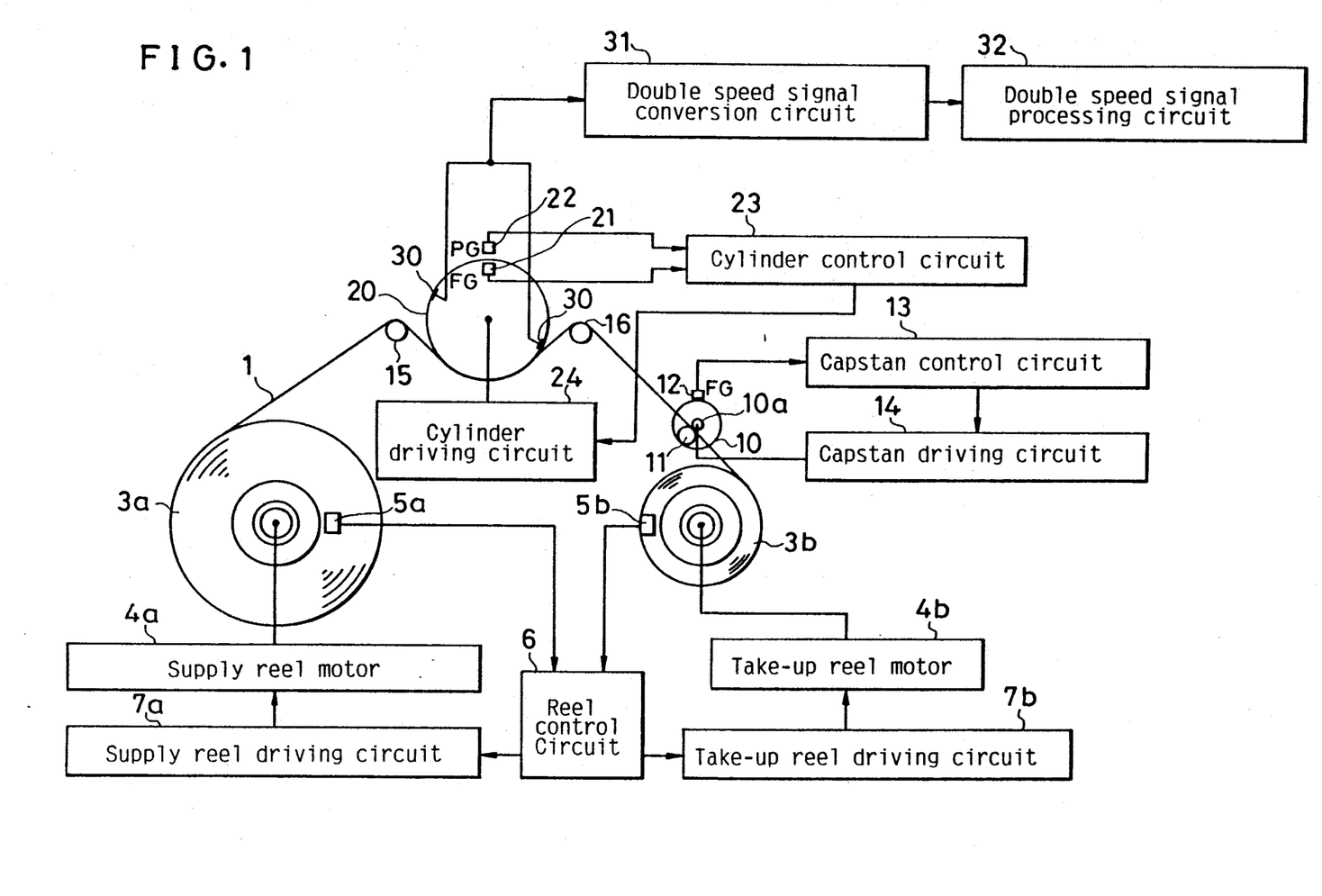
FIG. 1 is an illustration showing a construction of a tape reproducing apparatus in accordance with a first embodiment of the present invention.

FIG. 1 is an illustration showing a construction of a tape reproducing apparatus of a first embodiment. This tape reproducing apparatus is for reproducing signals at the speed of two-times as fast as the normal playback speed. In FIG. 1, recording medium such as a magnetic tape 1 (hereinafter is referred to simply as the tape) is wound onto a take-up reel 3b, which is driven by a take-up reel motor 4b, from a supply reel 3a driven by a supply reel motor 4a. A rotation speed sensor 5a, which is for detecting rotator speed of the supply reel 3a, generates FG pulses in proportion to the rotation speed of the supply reel motor 4a. A rotation speed sensor 5b for the take-up reel 3b generates FG pulses in proportion to the rotation speed of the take-up reel motor 4b. In response to these FG pulses issued from the rotation speed sensors 5a and 5b, a reel control circuit 6 gives control signals to reel driving circuits 7a and 7b in order to keep the tape speed constant. The reel motors 4a and 4b are controlled by the driving circuits 7a and 7b, respectively, in accordance with control signals issued from the reel control circuit 6. The above-mentioned supply reel 3a, the take-up reel 3b, the supply reel motor 4a, the take-up reel motor 4b, the rotation speed sensors 5a, 5b, the reel control circuit 6, and the driving circuits 7a, 7b constitute a high-speed tape moving system. A pinch roller 11 pushes the tape onto a capstan pin 10a, which is coaxially provided to a capstan motor 10, to forward the tape 1. A rotation speed sensor 12 for the capstan motor 10 generates FG pulses in proportion to the rotation speed of the capstan motor 10. In response to the FG pulses issued from the rotation speed sensor 12, a capstan control circuit 13 gives a capstan control signal to a capstan driving circuit 14. The capstan motor 10 is controlled to rotate at a predetermined speed by the capstan driving circuit 14 in accordance with output signals issued from the capstan control circuit 13. The capstan motor 10, the pinch roller 11, the rotation speed sensor 12 for the capstan motor 10, the capstan control circuit 13 and the capstan driving circuit 14 constitute a play-back speed tape-moving system. A pair of loading posts 15 and 16 push the tape 1 to thereby wind it on a rotation cylinder 20.

A rotation speed sensor 21 generates FG pulses in proportion to the rotation speed of the rotation cylinder 20. A position signal sensor 22 generates a PG pulse per one rotation of the rotation cylinder 20. In response to the FG pulse issued from the rotation speed sensor 21 and the PG pulse issued from the position signal sensor 22, a cylinder control circuit 23 issues control signals to a cylinder driving circuit 24 so that the rotation cylinder 20 is controlled to have a rotation speed responding to the present tape speed. The rotation cylinder 20 is driven by the cylinder driving circuit 24 in accordance with the control signals issued from the cylinder control circuit 23. Plural (e.g. two) heads 30 are fixedly mounted in the rotation cylinder. A double-speed signal conversion circuit 31 receives output signals, which are issued from the heads 30 at the time when the tape 1 is moved at a double speed, namely a speed of two times as fast as the standard speed, and converts them into digital signals. A double-speed signal processing circuit 32 makes a signal processing on the digital signals issued from the signal conversion circuit 31 at the double speed.

Figure 2:
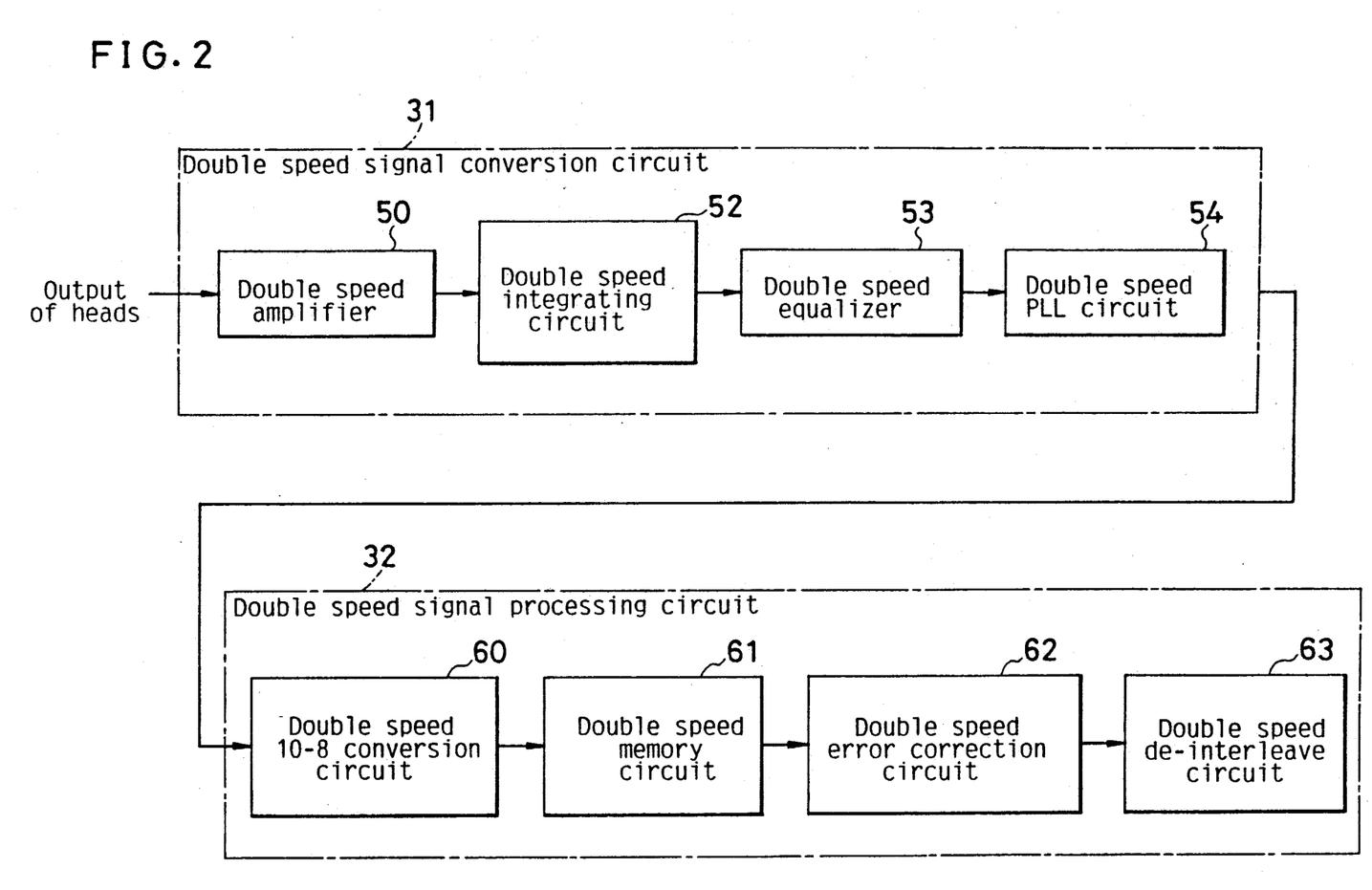
FIG. 2 is a block diagram showing internal circuits of both a double-speed signal conversion circuit 31 and a double-speed signal processing circuit 32 in FIG. 1.

Hereupon, the double-speed signal conversion circuit 31 and the double-speed signal processing circuit 32 are described in detail. FIG. 2 is a block diagram showing the double-speed signal conversion circuit 31 and the double-speed signal processing circuit 32. In the signal conversion circuit 31, a double-speed amplifier 50 amplifies output signals from the heads 30. A double-speed integrating circuit 52 integrates output signals issued from the double-speed amplifier 50, thereby compensating a differential characteristic of the output signals from the heads 30. A double-speed equalizer 53 shapes waveforms of output signals from the integrating circuit 52. A PLL (Phase Lock Loop) circuit 54 generates clock signals from output signals of the equalizer 53. In the double-speed signal processing circuit 32, a double-speed 10-8 conversion circuit 60 makes 10-8 (10 bit-8 bit) conversion on digital signals issued from the PLL circuit 54. A memory circuit 61 stores data processed through the 10-8 conversion circuit 60. A double-speed error correction circuit 62 reads out the data from the memory circuit 61 and executes error correction on the data. A double-speed de-interleave circuit 63 de-interleaves output signals, errors of which have been corrected by the error-correction circuit 62.

Operation of the above-mentioned tape reproducing apparatus is described hereinafter. In a playback state, the capstan motor 10 (FIG. 1) makes constant-speed rotation by means of the rotation speed sensor 12, the capstan control circuit 13 and the capstan driving circuit 14. The tape 1 is pushed by the pinch roller 11 onto the capstan pin 10a and is taken-up by the take-up reel 3b from the supply reel 3a at the double speed. At that time, the tape 1 is wound onto the rotation cylinder 20 by a pair of loading posts 15 and 16. The rotation cylinder 20 is rotated with the double speed by means of the rotation speed sensors 21, 22, the cylinder control circuit 23 and the cylinder driving circuit 24. The heads 30, which are fixedly mounted in the rotation cylinder 20, and reproduce information recorded in the tape 1. Output signals reproduced by the heads 30 have a frequency of two times as high as that of the standard speed and are inputted to the double-speed signal conversion circuit 31. Further, these signals are converted into digital signals, as shown in FIG. 2, by means of the double-speed amplifier 50, the double-speed integrating circuit 52, the double-speed equalizer 53 and the double-speed PLL circuit 54. The digital signals are subsequently inputted to the double-speed signal processing circuit 32. In the signal processing circuit 32 (FIG. 2), information of tape-position and music-number are derived from sub-code information recorded in the tape 1 through the double-speed 10-8 conversion circuit 60, the double-speed memory circuit 61, the double-speed error correction circuit 62 and the double-speed deinterleave circuit 63. At the same time, music signals etc. are also reproduced from PCM informations recorded in the tape 1. Double-speed playback is thus executed, thereby reducing working hours for the duplicating operation or the tape editing operation.

Next, operation in a high-speed moving state is described. In the high-speed moving state, the supply reel motor 4a and the take-up reel motor 4b are controlled by the reel control circuit 6 and the reel driving circuits 7a, 7b in response to the FG pulses issued from the rotation speed sensor 5a for the supply reel motor 4a and the rotation speed sensor 5b for the take-up reel motor 4b. The tape 1 is thereby advanced at high speed from the supply reel 3a/take-up reel 3b to the take-up reel 3b/supply reel 3a. At that time, the tape 1 is guided by two loading posts 15 and 16 so as to be partly wound onto the rotation cylinder 20 which is rotated at a predetermined speed in response to both the tape speed and the moving direction. The heads 30 mounted in the rotation cylinder 20 reproduces the informations recorded in the tape 1. In the similar way to that in the playback state, output signals reproduced by the heads 30 1 are inputted to the double-speed signal conversion circuit 31, thereby being converted into digital signals. Subsequently, the digital signals are inputted to the double-speed signal processing circuit 32, and informations about the tape-position and the music number etc. are derived from the sub-code information. Searching of the tape position or the music is thus executed.

Hereupon, in case where the sub-code informations in tracks obliquely formed in the tape 1 are read out at the high-speed moving state, the double-speed signal conversion circuit 31 and the double-speed signal processing circuit 32 operate normally only provided that an output frequency of the heads 30 is the same as that in the double-speed playback state. In order to make the output frequency from the heads 30 equal to that in the double-speed playback state, a component of the track direction in a relative speed between the heads 30 and the tape 1 has to be equal to that in the double-speed playback state.

Figure 7:
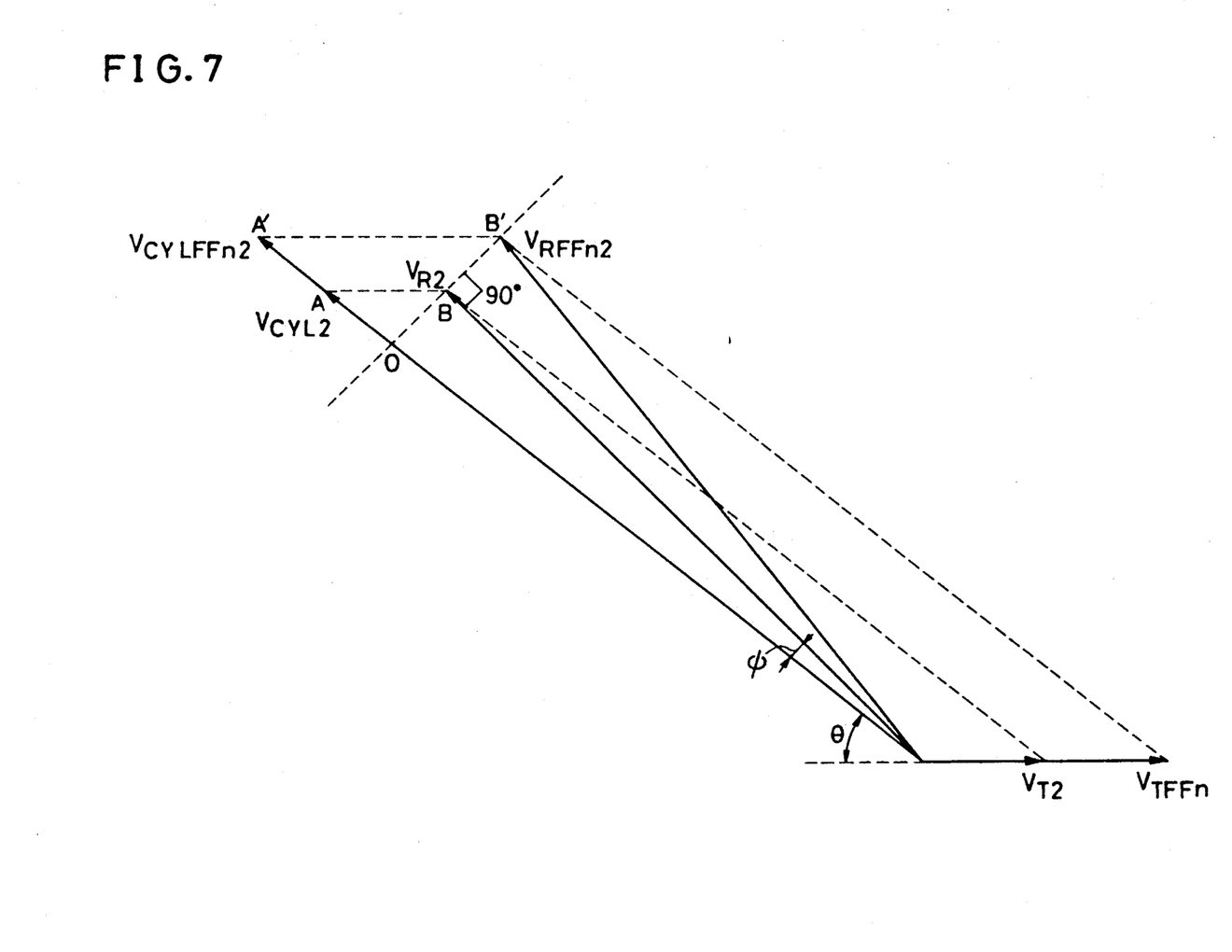
FIG. 7 is a vector diagram in the fast-forward state showing a relative speed between the head speed and the tape speed in the tape reproducing apparatus of the present invention.
Figure 8:
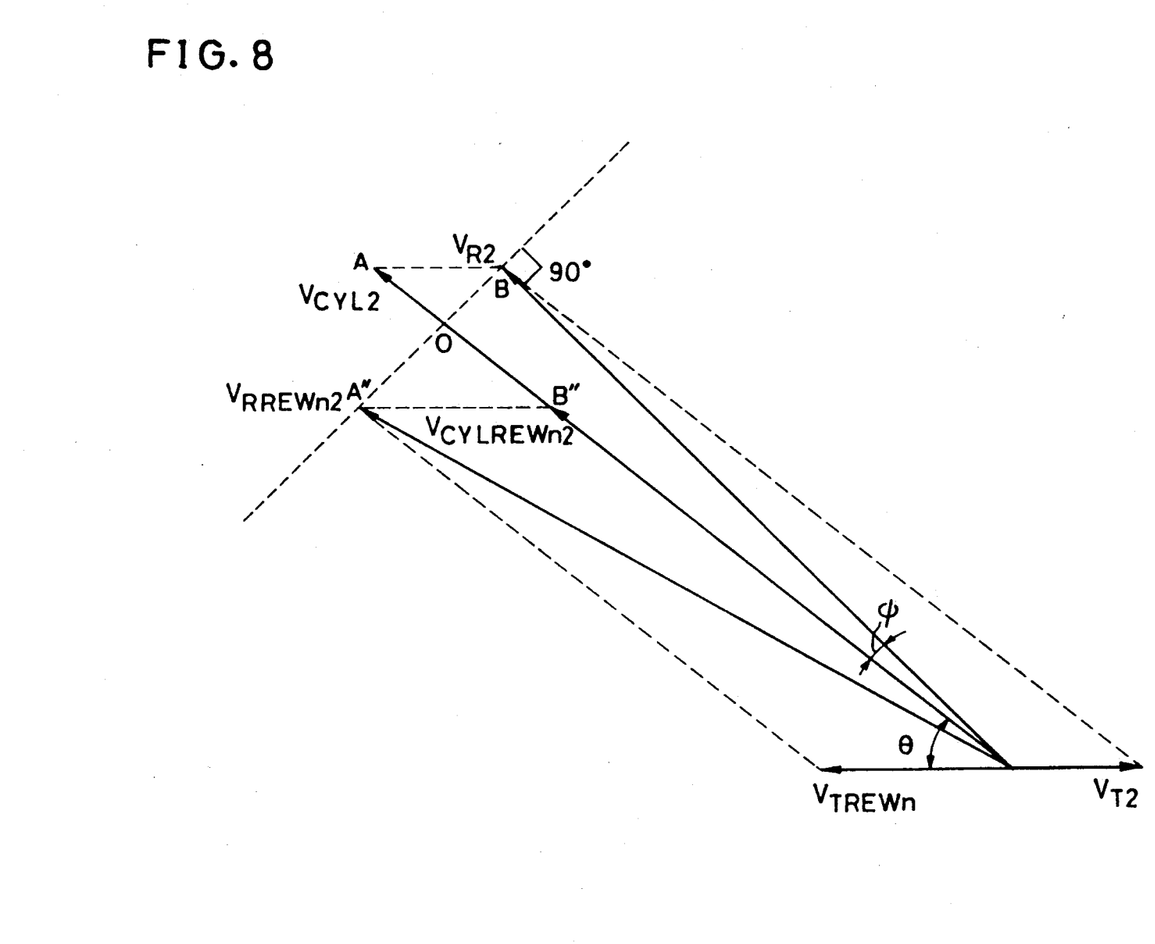
FIG. 8 is a vector diagram in the rewinding state showing a relative speed between the head speed and the tape speed in the tape reproducing apparatus of the present invention. the tape speed at the time when the tape speed is fluctuated in the tape reproducing apparatus of the present invention.

Hereafter, speed of the rotation cylinder in the high-speed moving state is analyzed with reference to FIGS. 7 and 8. FIG. 7 is a vector diagram showing relations among a tape speed of the fast forwarding, a circumferential speed of the rotation cylinder 20 and the relative speed. Now, definition is made as follows:

$V_T$: standard tape speed = 8.15 (mm/sec),
$V_{T2}$: double speed for moving the tape 1 = 16.3 (mm/sec),
$V_{CYL2}$: double speed in the circumference of the rotation cylinder 20 = 6283.19 (mm/sec),
$V_{R2}$: relative speed between the heads 30 and the tape 1 at the double-speed playback state = 6266.99 (mm/sec),
$V_{TFFn}$: tape speed of $n \times V_T$ in the fast-forward state,
$V_{CYLFFn2}$: circumferential speed of the rotation cylinder 20 in a ($n \times V_T$) fast-forward state,
$V_{RFFn2}$: relative speed between the heads 30 and the tape 1 in the ($n \times V_T$) fast-forward state, $\theta$: lead angle of the rotational cylinder 20 = 6° 22', and
$\phi$: angle difference between a track angle and the lead angle = 0° 0' 59.5".

In FIG. 7, when a track-directional component of the relative speed between the heads 30 and the tape 1 in the fast-forward state is made equal to that in the double-speed playback state, an end of a vector of the relative speed $V_{RFFn2}$ is located on a line which is intersected at right angles to a vector of the relative speed $V_{R2}$ between the heads 30 and the tape 1 in the double-speed playback state.

Since a triangle OAB is similar in shape to a triangle OA'B', the circumferential speed $V_{CYLFFn2}$ of the rotation cylinder 20 at the time when the tape is being advanced at the fast-forward speed of $n \times V_T$ is given by the following equation:

$$V_{CYLFFn2} = \frac{V_{R2}}{\cos\phi} + \frac{n}{2} \times \left( V_{CYL2} - \frac{V_{R2}}{\cos\phi} \right), \quad (101)$$

The "double" speed of the tape 1 and the rotation cylinder 20 affects the above equation in its first term and second term. When the speed is defined as a multiple "k" of the standard speed, the above equation can be represented by the following generic equation:

$$V_{CYLFFnk} = \frac{k \cdot V_R}{\cos\phi} + \frac{n}{k} \times \left( k \cdot V_{CYL} - \frac{k \cdot V_R}{\cos\phi} \right), \quad (101')$$

wherein
$V_{CYLFFnk}$: circumferential speed of the rotation cylinder 20 in the ($n \times V_T$) fast-forward state of a ($k \times$ standard-speed) playback apparatus,
$V_{CYL}$: circumferential speed of the rotation cylinder 20 at the standard speed, and
$V_R$: relative speed between the heads 30 and the tape 1 at the standard playback.

The equation (101) is a specific one of the generic equation (101') in case "k" is 2.

FIG. 8 is also a vector diagram showing relations among the tape speed, the circumferential speed of the rotation cylinder 20 and the relative speed in the rewinding state. In FIG. 8, the following letters newly used are defined as follows:

$V_{TREWn}$: rewinding tape speed of $n \times V_T$,
$V_{CYLREWn2}$: circumferential speed of the rotation cylinder 20 in a ($n \times V_T$) rewinding state, and
$V_{RREWn2}$: relative speed between the heads 30 and the tape 1 in the ($n \times V_T$) rewinding state.

In FIG. 8, when a track-directional component of the relative speed between the heads 30 and the tape 1 in the rewinding state is made equal to that in the double-speed playback state, and end of a vector of the relative speed $V_{RREWn2}$ is located on a line which is intersected at right angles to a vector of the relative speed $V_{R2}$ between the heads 30 and the tape 1 in the double-speed playback state.

Since the triangle OAB is similar in shape to a triangle OA"B", the circumferential speed $V_{CYLREWn2}$ of the rotation cylinder 20 at the time when the tape 1 is being rewound at the speed of $n \times V_T$ is given by the following equation:

$$V_{CYLREWn2} = \frac{V_{R2}}{\cos\phi} - \frac{n}{2} \times \left( V_{CYL2} - \frac{V_{R2}}{\cos\phi} \right). \quad (102)$$

In case the rewinding speed is $400 \times V_T$, the following equation is obtained:

$$V_{CYLREW(400)2} = \frac{6266.99}{\cos\phi} - \frac{400}{2} \times \left( 6283.19 - \frac{6266.99}{\cos\phi} \right)$$

$$= 3026.99 \text{ (mm/sec)},$$

from the equation (102). The result means that the rotation cylinder 20 is rotated so fast that failure of reading-out of the informations from the tape does not occur.

In the similar way to that in the fast-forward state, the equation (102) can be represented by the following generic equation:

$$V_{CYLREWnk} = \frac{k \cdot V_R}{\cos\phi} - \frac{n}{k} \times \left( k \cdot V_{CYL} - \frac{k \cdot V_R}{\cos\phi} \right),$$

wherein $V_{CYLREWnk}$: circumferential speed of the rotation cylinder 20 in the $(n \times V_T)$ rewinding state of the $(k \times \text{standard-speed})$ playback apparatus.

Incidentally, if the circumferential speed $V_{CYLREW400}$ of the rotation cylinder 20 in the speed of $400 \times V_T$ is calculated by the equation (5) of the prior art, it is as follows:

$$V_{CYLREW400} = \frac{3133.49}{\cos\phi} - 400 \times \left( 3141.59 - \frac{3133.49}{\cos\phi} \right)$$

$$= -106.51 \text{ (mm/sec)}.$$

As is apparent from this result, the calculated rotation of the rotation cylinder in the prior art results in a reverse rotation. Therefore, the sub-code informations in the tape can not be read-out by the heads.

Figure 9:
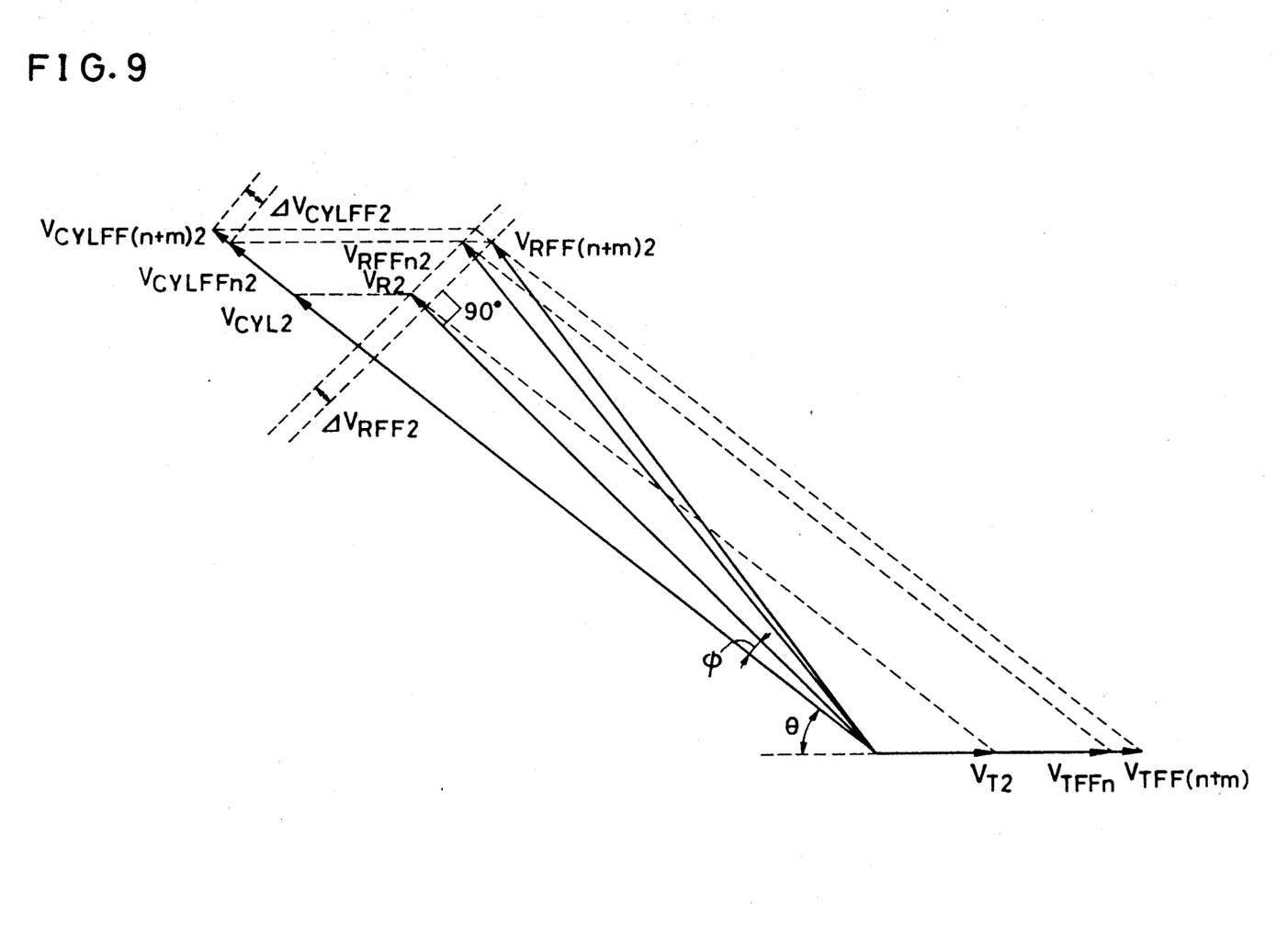

Next, a vector diagram after changing of speed is shown in FIG. 9. The relative speed between the heads 30 and the tape 1 is changed from a first state, which the tape 1 is moved at the speed of $n \times V_T$ with the relative speed kept to be equal to that in the playback state, to a second state that only the tape speed is changed to $(n+m) \times V_T$. In FIG. 9, the following definition is made in addition to those of FIGS. 7 and 8:

$\Delta V_{RFF2}$: change of track-directional component of the relative speed between the heads 30 and the tape 1 at the time when the moving speed of the tape 1 is changed from $n \times V_T$ to $(n+m) \times V_T$, and $\Delta V_{CYLFF2}$: change of the circumferential speed of the rotation cylinder 20 at the time when the moving speed of the tape 1 is changed from $n \times V_T$ to $(n+m) \times V_T$.

In FIG. 9, change of the tape speed is converted into change of the rotation speed of the rotation cylinder 20 in the following:

$$\Delta V_{CYLFF2} = V_{CYLFF(n+m)2} - V_{CYLFF(n)2}$$

$$= \frac{V_{R2}}{\cos\phi} + \frac{(n+m)}{2} \times \left( V_{CYL2} - \frac{V_{R2}}{\cos\phi} \right) -$$

-continued $$\frac{V_{R2}}{\cos\phi} + \frac{n}{2} \times \left( V_{CYL2} - \frac{V_{R2}}{\cos\phi} \right)$$

$$= \frac{m}{2} \times \left( V_{CYL2} - \frac{V_{R2}}{\cos\phi} \right).$$

Further, the above equation can be converted into change of track-directional component of the relative speed between the heads 30 and the tape 1, that is:

$$\Delta V_{RFF2} = \Delta V_{CYLFF2} \times \cos\phi$$

$$= \frac{m}{2} \times (V_{CYL2} \times \cos\phi - V_{R2}).$$

A changing ratio of the track-directional component of the relative speed is as follows:

$$\frac{\Delta V_{RFF2}}{V_{R2}} = \frac{m \times (V_{CYL2} \times \cos\phi - V_{R2})}{2 \times V_{R2}} \quad (103)$$

$$= m \times 1.292 \times 10^{-3}$$

$$= 0.1292 \times m \ (\%).$$

Hereupon, if the changing ratio of the track-directional component of the relative speed in the prior art is calculated, it is as follows:

$$\frac{\Delta V_{RFF}}{V_R} = \frac{m \times (V_{CYL} \times \cos\phi - V_R)}{V_R} \quad (104)$$

$$= 0.2585 \times m \ (\%).$$

As is apparent from the above results, the changing ratio of the track-directional component of the relative speed is lowered in the present invention in comparison with that of the prior art. Therefore, even in case where the tape speed is changed in the moving state, frequency fluctuation issued from the heads 30 is lowered, so that signal conversion and processing are surely executed by the double-speed signal conversion circuit 31 and the double-speed signal processing circuit 32, respectively. The sub-code informations in the tape are thus read-out surely despite the occurrence of frequency fluctuation.

Figure 3:
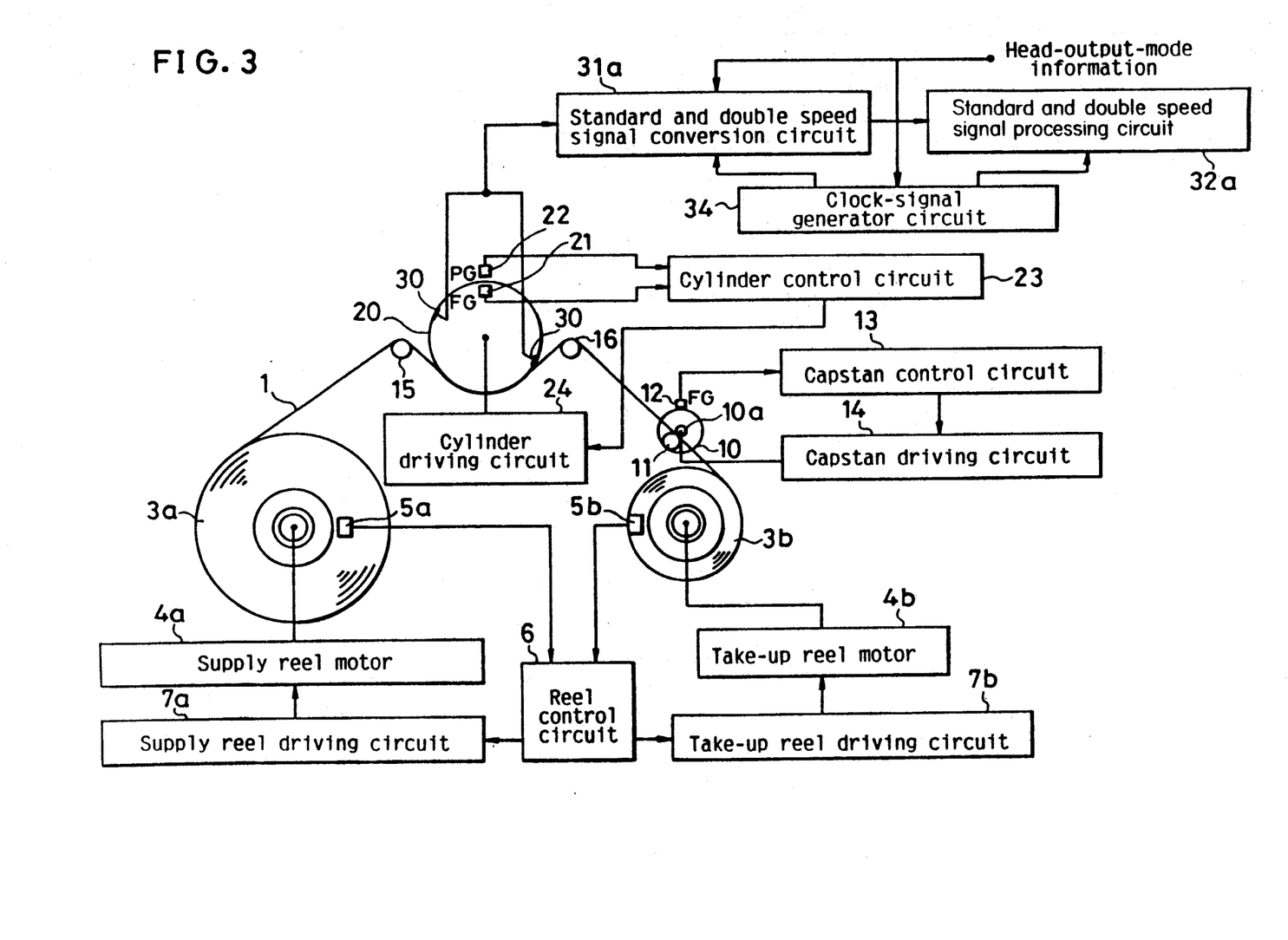
FIG. 3 is an illustration showing a construction of the tape reproducing apparatus in accordance with a second embodiment of the present invention.

FIG. 3 is an illustration showing a construction of the tape reproducing apparatus of a second embodiment. Corresponding parts and components to the first embodiment are shown by the same numerals and remarks, and the description thereon made in the first embodiment similarly applies. When the tape 1 and the rotation cylinder 20 are moved/rotated at the standard speed, output signals having a first frequency are issued from the heads 30. When the tape 1 and the rotation cylinder 20 are moved/rotated at their double-speeds, output signals having a second frequency are issued from the heads 30. These output signals having the first and second frequency are converted into digital signals by a standard and double speed signal conversion circuit 31. A standard and double speed signal processing circuit 32a makes signal processing on digital signals of the first frequency and the second frequency which are issued from the standard and double speed signal conversion circuit 31a. A clock-signal generator circuit 34 generates a clock signal, which is to be supplied to the standard and double speed signal conversion circuit 31a and the standard and double speed signal processing circuit 32a, in response to head-output-mode information supplied from an external circuit.

Figure 4:
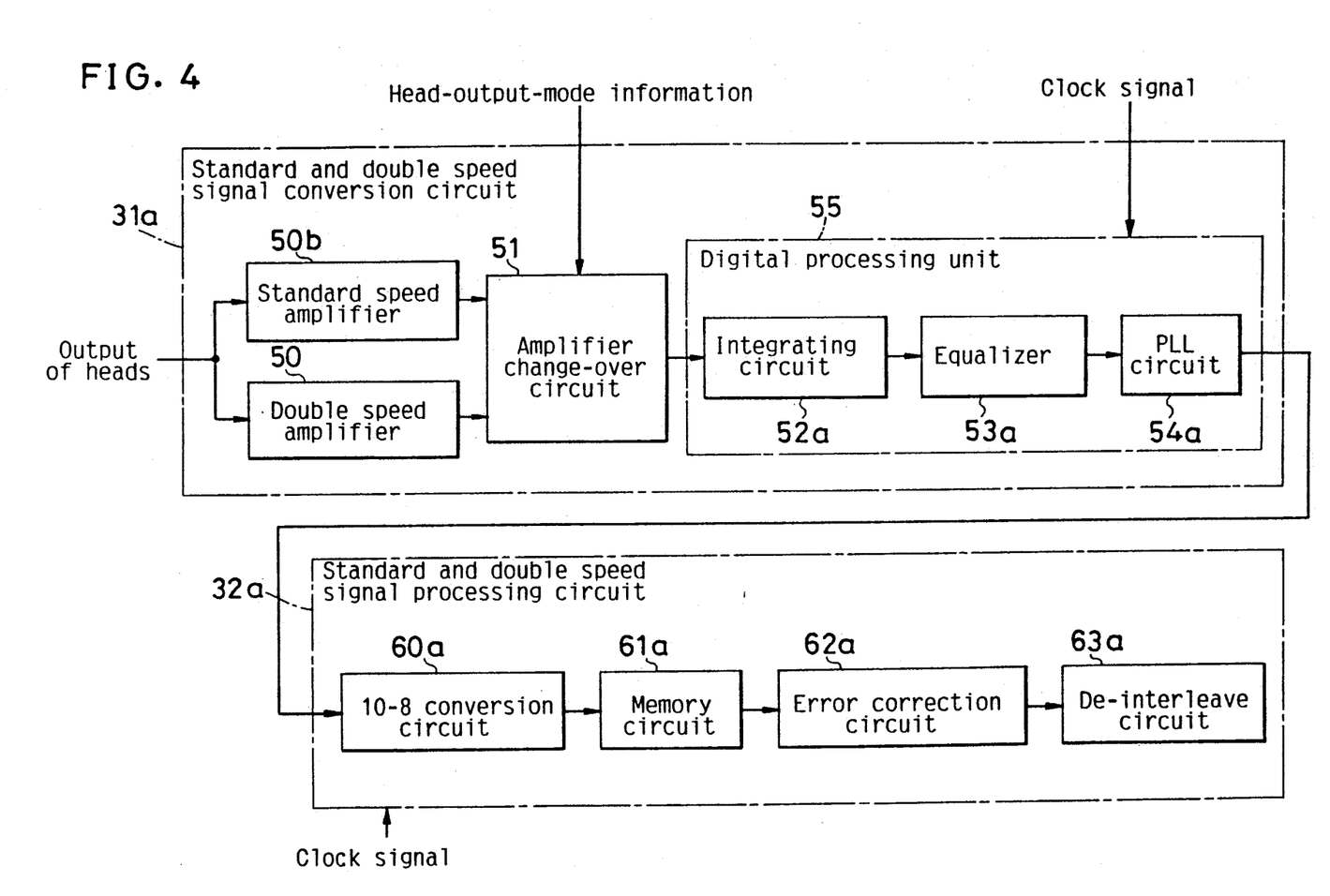
FIG. 4 is a block diagram showing the standard and double speed signal conversion circuit 31a and the standard and double speed signal processing circuit 32a in FIG. 3.

Hereupon, the standard and double speed signal conversion circuit 31a and the standard and double speed signal processing circuit 32a are described in detail. FIG. 4 is a block diagram showing the standard and double speed signal conversion circuit 31a and the standard and double speed signal processing circuit 32a. In the standard and double speed signal conversion circuit 31a, a standard speed amplifier 50b amplifies the head output signals having the first frequency, and a double speed amplifier 50 amplifies the head output signals having the second frequency. An amplifier change-over circuit 51 selects the output signals issued from the standard amplifier 50b and the double speed amplifier 50 in response to the head-output-mode information, and forwards them to a next digital processing unit 55. In the digital processing unit 55, an integrating circuit 52a, an equalizer 53a and a PLL circuit 54a have the similar basic functions to those of the first embodiment except that these circuits (52a, 53a, 54a) are of complete digital equipments and are able to handle both the frequencies of the standard speed and the double speed in response to a clock signal supplied from an external circuit. In the standard and double speed signal processing circuit 32a, a 10-8 conversion circuit 60a, a memory circuit 61a, an error correction circuit 62a and a de-interleave circuit 63a have similar basic functions to those of the first embodiment. These circuits (60a, 61a, 62a, 63a) are able to handle both the frequencies of the standard speed and the double speed in response to a clock signal supplied from the clock-signal generator circuit 34.

In the above-mentioned tape reproducing apparatus of the second embodiments, its operation is described hereafter. In FIG. 3, the tape 1 is driven at the standard speed in the standard playback state from the supply reel 3a to the take-up reel 3b. At that time, the head-output-mode information supplied to the amplifier change-over circuit 51 (FIG. 4) is of the standard speed mode. Therefore, the output signals issued from the standard speed amplifier 50b are selected and inputted to the digital processing unit 55, which is also set for the standard speed mode by the clock-signal generation circuit 34 (FIG. 3), in accordance with the head-output-mode information. The clock signal for the standard speed mode is also supplied to the standard and double speed signal processing circuit 32a by the clock-signal generation circuit 34. Thus, both the signal conversion and the signal processing in the standard speed mode are carried out by the standard and double speed signal conversion circuit 31a and the standard and double speed signal processing circuit 32a, respectively. Informations about the tape position and the music number are obtained from the sub-code information, and the music signals etc. are reproduced at the normal speed from the PCM informations.

Next, operation in the double speed playback state is described. In FIG. 3, the tape 1 is advanced at the double speed from the supply reel 3a to the take-up reel 3b. In FIG. 4, the head-output-mode information supplied to the amplifier change-over circuit 51 is set for the double speed. Therefore, the output signals issued from the double speed amplifier 50 are selected and inputted to the digital processing unit 55, which is also set for the double speed by receiving the clock signal for the double speed from the clock signal generation circuit 34, in accordance with the head-output-mode information.

The clock signal for the double speed mode is also supplied to the standard and double speed signal processing circuit 32a by the clock signal generation circuit 34. Thus, both the signal conversion and the signal processing in the double speed mode are carried out by the standard and double speed signal conversion circuit 31a and the standard and double speed signal processing circuit 32a, respectively. Informations about the tape position and the music number are obtained from the sub-code information, and the music signals etc. are reproduced at the double speed from the PCM informations.

Next, operation in the high-speed moving state is described. In the similar way to that in the first embodiment, the tape 1 is advanced at the high-speed from the supply reel 3a/take-up reel 3b to the take-up reel 3b/supply reel 3a. At that time, rotation speed of the rotation cylinder 20 is controlled so that the output signals reproduced by the heads 30 have the same frequency as that in the double speed playback state. Further, in the similar way to that in the double speed playback state, the head-output-mode information is set for the double speed. The clock signal for the double speed mode is also supplied to the standard and double speed signal conversion circuit 31a and the standard and double speed signal processing circuit 32a from the clock signal generation circuit 34. The sub-code informations are thus read-out despite the high speed.

As a result, it is possible to rotate the rotation cylinder 20 sufficiently fast in the rewinding state in comparison with the prior art, thereby reducing failure in reading-out of the sub-code informations in the tape 1. Moreover, the tape speed is made very high in the high speed moving state. In case where the tape speed is changed in the moving state, frequency fluctuation issued from the heads 30 is of so low level that signal conversion and processing are surely executed by the standard and double speed signal conversion circuit 31a and the standard and double speed signal processing circuit 32a, respectively. The sub-code informations in the tape are thus read-out surely despite the occurrence of frequency fluctuation.

Since the above-mentioned second embodiment employs a change-over system of clock to use the standard and double speed signal conversion circuit 31a and the standard and double speed signal processing circuit 32a, components required are decreased, thereby enabling minimization of a casing.

Figure 5:
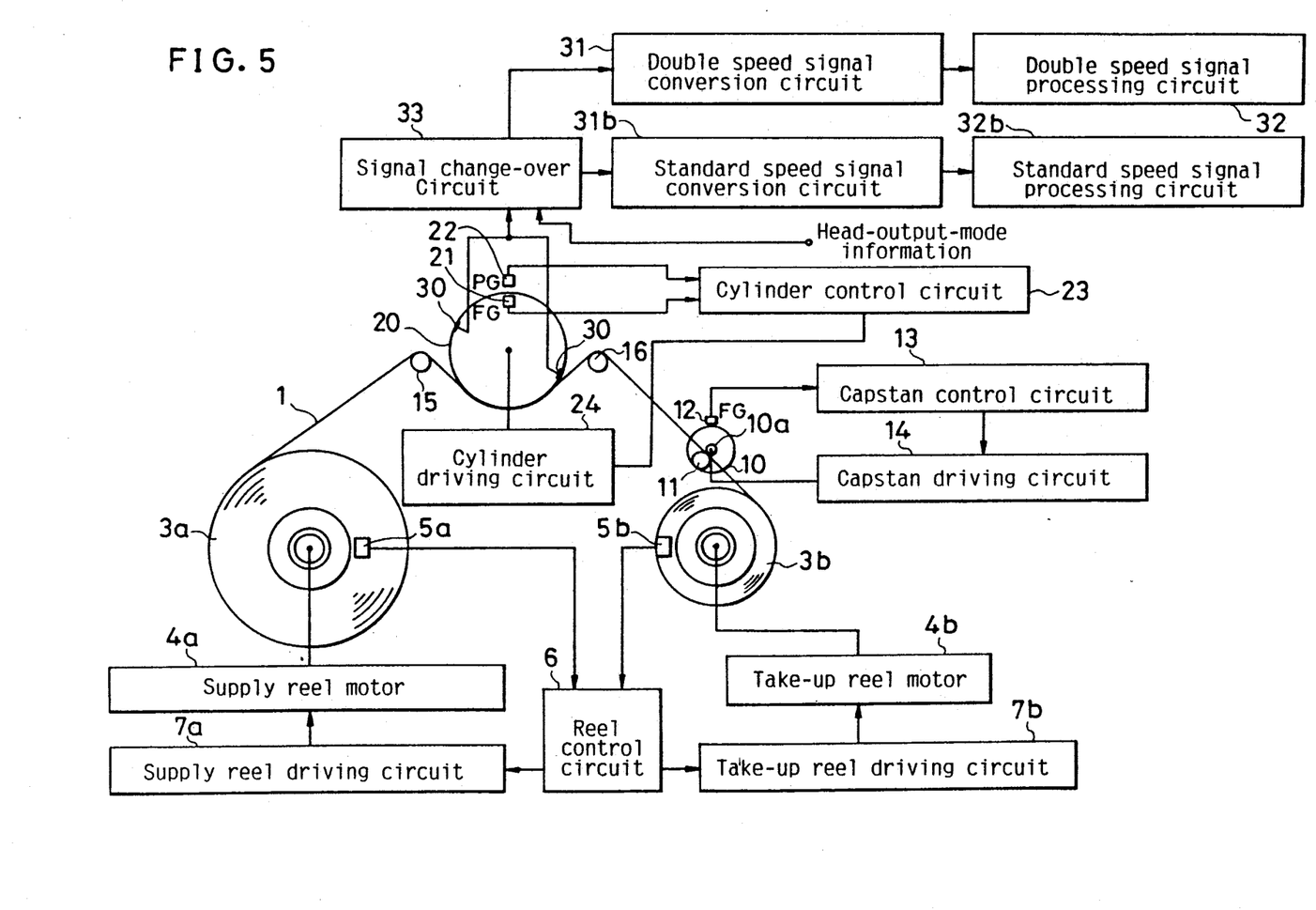
FIG. 5 is an illustration showing a construction of the tape reproducing apparatus in accordance with a third embodiment of the present invention.

FIG. 5 is an illustration showing a construction of the tape reproducing apparatus of a third embodiment. Corresponding parts and components to the first embodiment are shown by the same numerals and remarks, and the description thereon made in the first embodiment similarly applies.

When the tape 1 and the rotation cylinder 20 are moved/rotated at the standard speed, output signals having a first frequency are issued from the heads 30. The output signals having the first frequency are converted into digital signals by a standard speed signal conversion circuit 31b. A standard speed signal processing circuit 32b makes signal processing on digital signals of the first frequency issued from the standard speed signal conversion circuit 31b. A signal change-over circuit 33 selectively forwards the output signals issued from the heads 30 to the standard speed signal conversion circuit 31b or the double speed signal conversion circuit 31, in response to the head-output-mode informations supplied from an external circuit.

Figure 6:
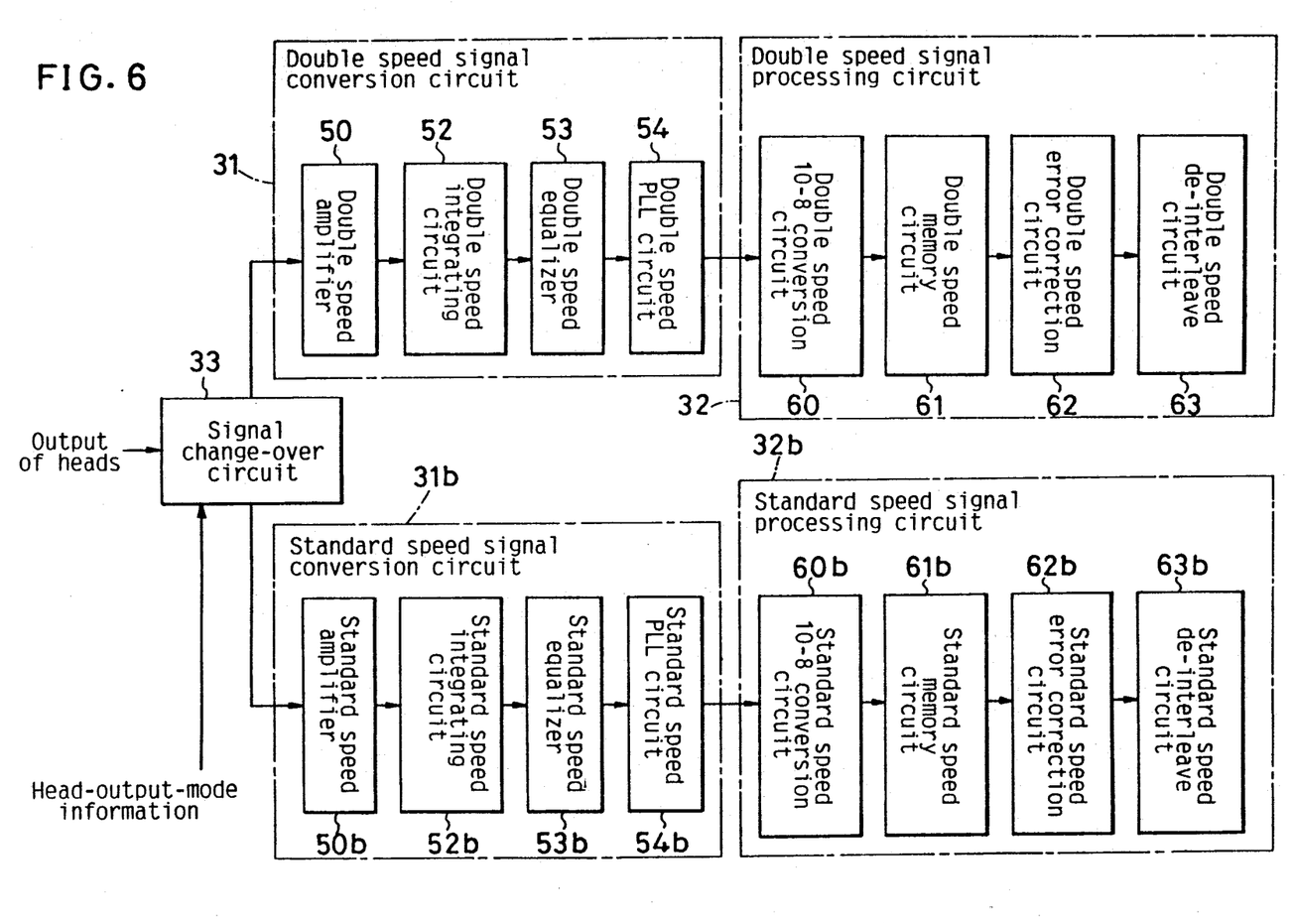
FIG. 6 is a block diagram showing the double speed signal conversionning circuit 31, the double speed signal processing circuit 32, the standard speed signal conversion circuit 31b, the standard speed signal processing circuit 32b and the signal change-over circuit 33 in FIG. 5.

Hereupon, the standard speed signal conversion circuit 31b and the standard speed signal processing circuit 32b are described in detail. FIG. 6 is a block diagram showing the double speed signal conversion circuit 31, the double speed signal processing circuit 32, the standard speed signal conversion circuit 31b, the standard speed signal processing circuit 32b and the signal change-over circuit 33. Internal circuits of the double speed signal conversion/processing circuit 31/32 are the same as the first embodiment. The standard speed signal conversion circuit 31b consists of a standard speed amplifier 50b, a standard speed integrating circuit 52b, a standard speed equalizer 53b and a standard speed PLL circuit 54b. The standard speed signal processing circuit 32b consists of a standard speed 10-8 conversion circuit 60b, a standard speed memory circuit 61b, a standard speed error correction circuit 62b and a standard speed de-interleave circuit 63b. Basic functions of these internal circuits (50b, 52b, 53b, 54b, 60b, 61b, 62b and 63b) are similar to those of the internal circuits (50, 52, 53, 54, 60, 61, 62 and 63) in the double speed signal conversion circuit 31 and the processing circuit 32, respectively, except that the above-mentioned internal circuits for the standard speed handle the head-output-signals having the frequency of the standard playback.

In the above-mentioned tape reproducing apparatus of the third embodiments, its operation is described hereafter. In FIG. 5, the tape 1 is driven at the standard speed in the standard playback state from the supply reel 3a to the take-up reel 3b. At that time, the head-output-mode information supplied to the signal change-over circuit 33 is of the standard speed mode. Therefore, the signal change-over circuit 33 forwards the head-output-signals to the standard speed signal conversion circuit 31b. The digital signals at the standard speed, which are issued from the standard speed signal conversion circuit 31b, are inputted to the standard speed signal processing circuit 32b. In the signal processing circuit 32b, informations about the tape position and the music number are obtained from the sub-code information. Further, the music signals etc. are reproduced at the normal speed from the PCM informations.

Next, operation in the double speed playback state is described. In FIG. 5, the tape 1 is driven at the double speed from the supply reel 3a to the take-up reel 3b. In FIG. 6, the head-output-mode information supplied to the signal change-over circuit 33 is set for the double speed, and the signal change-over circuit 33 forwards the head-output-signals to the double speed signal conversion circuit 31. The digital signals at the double speed, which are issued from the double speed signal conversion circuit 31, are inputted to the double speed signal processing circuit 32. In the signal processing circuit 32, informations about the tape position and the music number are obtained from the sub-code information. Further, the music signals etc. are reproduced at the double speed from the PCM informations, thereby reducing working hours for editing or making a reproduction.

Next, operation in the high-speed moving state is described. In the similar way to that in the first embodiment, the tape 1 is driven at the high-speed from the supply reel 3a/take-up reel 3b to the take-up reel 3b/supply reel 3a. At that time, rotation speed of the rotation cylinder 20 is controlled so that the output signals reproduced by the heads 30 have the same frequency as that in the double speed playback state. Further, in the similar way to that in the double speed playback state, the head-output-mode information is set for the double speed. The signal change-over circuit 33 forwards the head-output-signals to the double speed signal conversion circuit 31. The digital signals issued from the double speed signal conversion circuit 31 are inputted to the double speed signal processing circuit 32. In the signal processing circuit 32, informations about the tape position and the music number are obtained from the sub-code information.

As a result, it is possible to rotate the rotation cylinder 20 sufficiently fast in the rewinding state in comparison with the prior art, thereby reducing failure in reading-out of the sub-code informations in the tape 1. Moreover, the tape speed is made very high speed in the high speed moving state. In case where the tape speed is changed in the moving state, frequency fluctuation issued from the heads 30 is so low level that signal conversion and processing are surely executed by the double speed signal conversion circuit 31 and the double speed signal processing circuit 32, respectively. The sub-code informations in the tape are thus read-out surely despite the occurrence of frequency fluctuation.

Apart from the above-mentioned third embodiment wherein the double speed playback is adopted, a modified embodiment may be such that processing of the digital signals having the second frequency is limited only for the fast-forwarding state and the rewinding state where only processing of the sub-code informations is carried out. According to this modified embodiment, processing ability required for the signal processing circuit is cut down, thereby simplifying the construction further.

Besides, apart from the above-mentioned all embodiments wherein three motors are individually used for the capstan motor 10, the supply reel motor 4a and the take-up reel motor 4b, another embodiment may be such that some of these are driven by a common motor.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An apparatus for high speed searching and reproduction of data recorded in a tape medium, comprising:
 a magnetic tape in which oblique tracks are to be formed with respect to a moving direction of the magnetic tape;
 first moving means for moving said magnetic tape at least at a constant speed which is set faster than a standard speed;
 high-speed moving means for moving said magnetic tape at a speed which is set faster than any tape speed realized by said first moving means;
 a rotation cylinder having at least one head, said head issuing output signals;
 speed sensor means for generating pulses in proportion to a rotation speed of said rotation cylinder;
 control means for controlling said rotation speed of the rotation cylinder in response to a speed of said magnetic tape based on said pulses, said control means controlling said rotation speed so that a track-directional component of a relative speed between said head and said magnetic tape in a high speed moving state realized by said high-speed moving means equals a first moving state realized by said first moving means;

signal conversion means for converting at least sub-code data of said output signals issued from said head into digital signals in both said first moving state and said high-speed moving state, said sub-code data representing tape-position information; and signals processing means for processing said digital signals issued from said signal conversion means to read out said sub-code data.

2. An apparatus in accordance with claim 1, wherein said signal conversion means converts output signals issued from said head into digital signals at a time when said output signals have a frequency based on a state that said magnetic tape is moved at said constant speed and said rotation cylinder is rotated at a constant speed which is set faster than a standard speed of said rotation cylinder.

3. An apparatus for high speed searching and reproduction of data recorded in a tape medium, comprising:

a magnetic tape in which oblique tracks are to be formed with respect to a moving direction of the magnetic tape;

first moving means for moving said magnetic tape at least at a standard speed and a first constant speed which is set faster than said standard speed;

high-speed moving means for moving said magnetic tape at a speed which is set faster than any tape speed realized by said first moving means;

a rotation cylinder having at least one head, said head issuing output signals;

speed sensor means for generating pulses in proportion to a rotation speed of said rotation cylinder;

control means for controlling said rotation speed of the rotation cylinder in response to a speed of said magnetic tape based on said pulses, said control means controlling said rotation speed so that a track-directional component of a relative speed between said head and said magnetic tape in a high-speed moving state realized by said high-speed moving means equals a state of said first constant speed realized by said first moving means;

signal conversion means for converting at least sub-code data of said output signals of a first frequency and a second frequency issued from said head into digital signals, said sub-code data representing tape-position information, said first frequency being issued when said magnetic tape moves at said standard speed and said second frequency being issued when said magnetic tapes moves at said state of said first constant speed and said high-speed moving state;

signal processing means for processing both said digital signals of first frequency and second frequency issued from said signal conversion means to read out said sub-code data; and clock signal generation means for generating and supplying clock signals required for processing said output signals of first frequency and second frequency to both said signal conversion means and said signal processing means.

4. An apparatus in accordance with claim 3, wherein said first moving means moves said magnetic tape at said standard speed and a second constant speed which is set faster than said standard speed for said magnetic tape.

5. An apparatus in accordance with claim 3, wherein said signal conversion means converts said output signals of said first frequency issued in a state that said magnetic tape is moved at said standard speed for said magnetic tape and said rotation cylinder is rotated at a first standard speed for said rotation cylinder and said second frequency being issued in a state that said magnetic tape is moved at a second constant speed which is set faster than said standard speed for said magnetic tape and said rotation cylinder is rotated at a second constant speed which is set faster than said first standard speed for said rotation cylinder.

6. An apparatus in accordance with claim 5, wherein said signal conversion means converts output signals issued from said head into digital signals at a time when said tape is moved at a speed of integer multiple of said magnetic standard speed for said tape and said rotation cylinder is rotated at a constant speed of integer multiple of said standard speed for said rotation cylinder.

7. An apparatus in accordance with claim 6, wherein said first moving means moves said magnetic tape at a constant speed of at least integer multiple of said standard speed for said magnetic tape.

8. An apparatus in accordance with claim 5, wherein said signal conversion means converts said output signals of first frequency issued in a state that said magnetic tape is moved at said standard speed for said magnetic tape and said rotation cylinder is rotated at said first standard speed for said rotation cylinder and converts said output signals of second frequency issued in a state that said magnetic tape is moved at a second constant speed of integer multiple of said standard speed for said magnetic tape and said rotation cylinder is rotated at a constant speed of integer multiple of said first standard speed for said rotation cylinder.

9. An apparatus in accordance with claim 8, wherein said first moving means moves said magnetic tape at said standard speed for said magnetic tape and a second constant speed of integer multiple of said standard speed for said magnetic tape.

10. An apparatus for high speed searching and reproduction of data recorded in a tape medium, comprising:

a magnetic tape in which oblique tracks are to be formed with respect to a moving direction of the magnetic tape;

first moving means for moving said magnetic tape at least at a standard speed and a first constant speed which is set faster than said standard high-speed moving means for moving said magnetic tape at a speed which is set faster than any tape speed realized by said first moving means;

a rotation cylinder having at least one head, said head issuing output signals;

speed sensor means for generating pulses in proportion to a rotation speed of said rotation cylinder;

control means for controlling said rotation speed of the rotation cylinder in response to a speed of said magnetic tape based on said pulses, said control means controlling said rotation speed so that a track-directional component of a relative speed between said head and said magnetic tape in a high-speed moving state realized by said high-speed moving means equals a state of said first constant speed realized by said first moving means;

first signal conversion means for converting at least first sub-code data of said output signals of a first frequency issued from said head into digital signals in a state of said standard speed realized by said first moving means, said first sub-code data representing tape-position information;

first signal processing means for processing said digital signals issued from said first signal conversion means with said first frequency to read out said first sub-code data;

second signal conversion means for converting at least second sub-code data of said output signals of a second frequency issued from said head into digital signals in said state of said first constant speed and said high-speed moving state, said second sub-code signals representing tape-position information;

second signal processing means for processing said digital signals issued from said second signal conversion means with said second frequency to read out said second sub-code data; and signal change-over means for selectively forwarding output signals issued from said head to one of said first signal conversion means and said second signal conversion means.

11. An apparatus in accordance with claim 10, wherein
said first moving means moves said magnetic tape at said standard speed for said magnetic tape and a second constant speed which is set faster than said standard speed for said magnetic tape.

12. An apparatus in accordance with claim 10, wherein
said first signal conversion means converts output signals of said first frequency issued at a time when said magnetic tape is moved at said standard speed for said magnetic tape and said rotation cylinder is rotated at a first standard speed for said rotation cylinder; and second signal conversion means converts output signals of said second frequency issued at a time when said magnetic tape is moved at a second constant speed which is set faster than said standard speed for said magnetic tape and said rotation cylinder is rotated at a second constant speed which is set faster than said standard speed for said rotation cylinder.

13. An apparatus in accordance with claim 12, wherein
said second signal conversion means converts said output signals of second frequency issued in a state that said magnetic tape is moved at a second constant speed of integer multiple of said standard speed for said magnetic tape and said rotation cylinder is rotated at a constant speed of integer multiple of said first standard speed for said rotation cylinder.

14. An apparatus in accordance with claim 13, wherein
said first moving means moves said magnetic tape at said standard speed for said magnetic tape and a second constant speed of integer multiple of said first standard speed for said tape.

* * * * *